Sept. 26, 1939.  E. R. FITCH  2,173,938
RAIL SANDING DEVICE
Filed Jan. 18, 1938
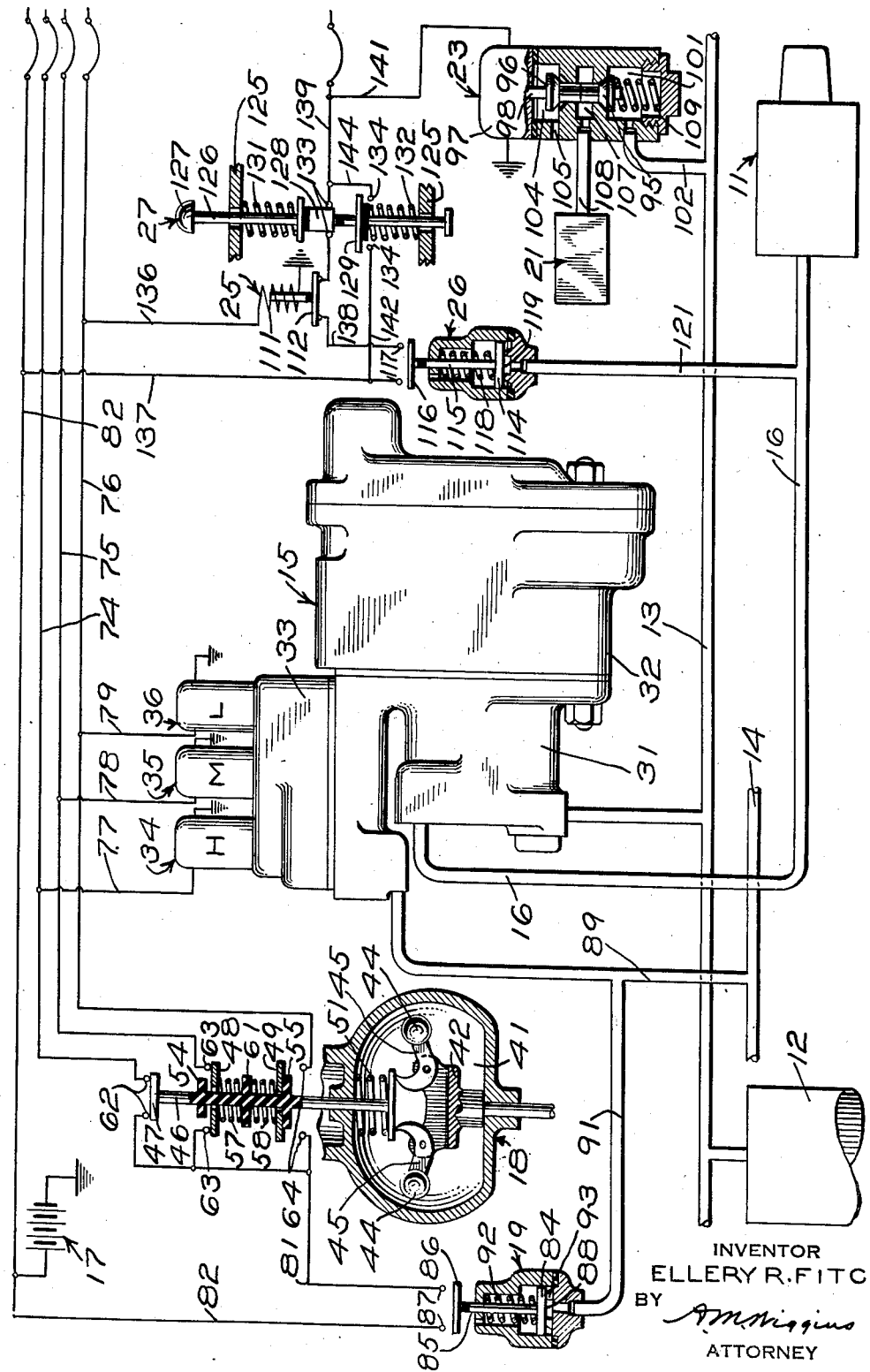
INVENTOR
ELLERY R. FITCH
BY
*A. M. Higgins*
ATTORNEY Patented Sept. 26, 1939

2,173,938

UNITED STATES PATENT OFFICE 2,173,938

RAIL SANDING DEVICE

Ellery R. Fitch, Irwin, Pa., assignor to The Westinghouse Air Brake Company, Wilmerding, Pa., a corporation of Pennsylvania Application January 18, 1938, Serial No. 185,494

19 Claims. (Cl. 291—15)

This invention relates to rail-sanding devices and particularly to automatically controlled rail-sanding devices.

As is well known, the coefficient of friction between a brake shoe and the rim of a car wheel increases as the speed of the car decreases and, conversely, that the coefficient of friction between the brake shoe and the rim of the car wheel decreases as the speed of the car increases. Accordingly, if the brake shoes are applied to the car wheels with a high braking force at the higher speeds the force retarding rotation of the car wheels may so increase, due to the increase in the coefficient of friction with reducing rotative speed of the car wheels, as to exceed the limit of the coefficient of adhesion between the car wheels and the track rails and thus cause the car wheels to lock and slide along the rails, unless the braking force is reduced as the speed of the car reduces.

It has been proposed, therefore, to provide control apparatus effective to reduce the braking force, that is the brake cylinder pressure, as the speed of the car reduces, in order to prevent sliding of the car wheels. One such brake equipment is disclosed in the copending application Serial No. 88,098 of Ellis E. Hewitt, filed June 30, 1936, issued as Patent No. 2,140,624, December 20, 1938, and assigned to the assignee of the present application.

Due to weather conditions, such as rain, sleet, snow, and ice, or for other reasons, the coefficient of adhesion between the car wheels and the track rails may be greatly reduced from the expected average value and thus, notwithstanding the reduction of the braking force or brake cylinder pressure with the reduction in the speed of the car, sliding of the car wheels may occur.

If the operator or driver of the car or train is on the alert he may manually effect the sanding of the track rails to cause an increase in the coefficient of adhesion between the car wheels and track rails so as to decrease the likelihood of the occurrence of sliding of the wheels.

Since the operator or driver may apply the brakes to an excessive degree and fail to cause sanding of the rails, it is desirable that the sanding of the rails be effected automatically and independently of any action on the part of the operator in order to render the operation of the car or train more safe and also to prevent wheel sliding and the consequent objectionable flat spots on the car wheels which result therefrom.

It is accordingly an object of my invention to provide apparatus for automatically causing sanding of the track rails whenever an application of the brakes in excess of a certain degree is initiated.

Another object of my invention is to provide apparatus effective to initiate sanding automatically and also to cause automatic termination of sanding whenever the car or train reduces below a certain uniform low speed.

Another object of my invention is to provide automatic sanding apparatus, such as indicated in the foregoing objects, wherein the automatic sanding of the rails may be suppressed under the control of the operator at any time.

A further object of my invention is to provide automatic sanding apparatus, of the character indicated in the foregoing objects, adapted to enable sanding of the rails at any time under the control of the operator.

The above objects, and other objects of my invention which will be made apparent hereinafter, are attained by means of an embodiment of my invention subsequently to be described and shown illustratively in the single figure of the accompanying drawing.

Description

The brake equipment shown in the drawing comprises a brake cylinder 11, a source of fluid pressure such as a main reservoir 12, a pipe 13 hereinafter referred to as the supply pipe which is constantly connected to and charged with fluid under pressure from the main reservoir 12, a control pipe 14 which is normally vented to atmosphere and which is adapted to be charged with fluid at different desired pressures by a suitable valve device (not shown) under manual control, an electropneumatic valve mechanism 15 for controlling the supply of fluid under pressure from the supply pipe 13 to a pipe 16 leading to the brake cylinder 11 and for controlling the release of fluid under pressure from the brake cylinder pipe 16, a source of electrical energy such as a storage battery 17, a governor switch device 18 operatively responsive to the speed of the car or train for selectively controlling energization and deenergization of electroresponsive elements of the control valve mechanism 15, and a pressure operated switch 19 controlled according to the pressure in the control pipe 14 for controlling the electrical connection from the battery 17 to the governor switch 18.

According to my invention, the equipment shown further comprises a sanding device 21 operable upon the supply of fluid under pressure thereto to cause sanding of the track rails, and a magnet valve device 23 for controlling the supply of fluid under pressure from the supply pipe 13 to the sanding device 21. For the purpose of controlling the magnet valve device 23, I have provided an arrangement including a relay 25 controlled by the governor device 18, a pressure operated switch 26 controlled by the pressure in the brake cylinder 11, and a manually operable switch device 27.

Considering the parts of the equipment in greater detail, the valve mechanism 15 is of the type described and claimed in the above-referred to copending application Serial No. 88,098 of Ellis E. Hewitt. Since reference may be had to the copending application for a detailed description of the valve mechanism 15, it is shown only in outline herein.

Briefly, the valve mechanism 15 comprises a self-lapping valve section 31, a diaphragm section 32 comprising a plurality of unconnected movable abutments or diaphragms disposed in spaced coaxial relation and decreasing successively in effective pressure areas, and a magnet valve section 33 including a so-called high magnet valve 34, a medium magnet valve 35 and a low magnet valve 36.

The magnet valves 34, 35 and 36 control the supply of fluid under pressure to and the release of fluid under pressure from the chambers formed in the casing of the valve mechanism 15 between successive diaphragms of the diaphragm section 32 and thus, due to the difference in area of the several diaphragms control the pressure established in the brake cylinder.

When the high magnet valve 34 and the medium magnet valve 35 are energized while the low magnet valve 36 is deenergized, the valve mechanism 15 is effective to establish a pressure in the brake cylinder 11 which is substantially equal to the pressure established in the control pipe 14. When the medium magnet valve 35 is energized and the high magnet valve 34 and low magnet valve 36 are deenergized, the valve mechanism 15 causes the pressure established in the brake cylinder 11 to be a certain fraction, such as three-fourths, of the pressure established in the control pipe 14. When all of the magnet valve devices 34, 35 and 36 are deenergized, the valve mechanism 15 establishes a pressure in the brake cylinder 11 which is a lower fraction, such as one-half, of the pressure in the control pipe. When the low magnet valve 36 is energized and the high and medium magnet valves 34 and 35 are deenergized, the valve mechanism 15 establishes a pressure in the brake cylinder 11 which is a still further lower fraction, such as one-third, of the pressure in the control pipe.

The governor switch 18 is illustrative of any suitable device for selectively controlling energization and deenergization of the magnet valve devices 34, 35 and 36 according to the speed of the car or train. As diagrammatically shown, the governor switch 18 may comprise a casing having a chamber 41 containing a device responsive to the speed of the car or train, such as the fly-ball device 42, which is rotated according to the speed of the car or train as by connection to an axle of the car through an intervening gear-train or belt-and-pulley arrangement. As the fly-balls 44 of the device 42 move outwardly with increasing rotative speed, the inner ends of the pivoted levers 45 carrying the fly-balls are urged upwardly with a force proportional to the centrifugal force acting on the fly-balls and thus exert an upward force on the lower end of a stem 46 carrying a plurality of contact-bridging members 47, 48 and 49, raising the stem against the yielding opposition of a spring 51. The contact-bridging member 47 is fixed at the upper end of the stem 46 while the contact-bridging members 48 are slidably urged along the stem toward limit stops or flanges 54 and 55, respectively, by springs 57 and 58 interposed between each contact-bridging member and an intervening flange or collar 61 on the stem.

The contact-bridging members 47, 48 and 49 are adapted to connect in bridging or circuit-closing relation respective pairs of contact members 62, 63 and 64. The contact members 62, 63 and 64 are carried in insulated fixed positions on the casing of the governor switch 18 in such relation to the contact-bridging members 47, 48 and 49, respectively, that when the vehicle speed exceeds a certain high speed, such as sixty-five miles per hour, the stem 46 is raised so as to cause the contact-bridging members 47 and 48 to engage their respectively associated contact members 62 and 63 in circuit-closing contact while the contact-bridging member 49 is raised out of engagement with its associated contact members 64.

When the speed of the car reduces below the certain high speed of sixty-five miles per hour, the spring 51 is effective to urge the stem 46 downwardly to thereafter effect disengagement of the contact-bridging member 47 from its contact members 62, but the spring 57 continues to urge the contact-bridging member 48 along the stem 46 and thereby maintain it in engagement with the contact members 63 as the speed of the car reduces. At this time the stem 46 is still raised sufficiently to maintain the contact-bridging member 49 out of contact with the contact members 64. The contact-bridging member 48 remains in circuit-closing contact with its contact members 63 and the contact-bridging member 47 remains out of contact with its associated contact members as long as the speed of the car exceeds an intermediate speed such as forty miles per hour.

When the speed of the car reduces below the intermediate speed of forty miles per hour, the contact-bridging member 48 is engaged by the stop 54 and moves downwardly with the stem 46 to disengage and thereafter remain disengaged from its associated contact members 63. As the car or train reduces in speed from the intermediate speed of forty miles per hour, all of the contact-bridging members 47, 48 and 49 are out of engagement with their associated contact members.

When the car reduces in speed to a certain uniform low speed, such as twenty miles per hour, contact-bridging member 49 engages its associated contact members 64.

As the speed of the car or train reduces below the certain uniform low speed of twenty miles per hour, the spring 58 acting on the contact-bridging member 49 is compressed to permit the stem 46 to move downwardly while the contact bridging member 49 remains in engagement with its contact members 64. Thus when the car or train travels at a speed less than the certain uniform speed of twenty miles per hour, and when the car or train is completely stopped, the contact-bridging member 49 engages its contact members 64 while the contact-bridging members 47 and 48 are disengaged from their associated contact members.

The magnet valve devices 34, 35 and 36 of the valve mechanism 15 are selectively controlled by the governor switch 18 through the medium of three train wires 74, 75 and 76 to which one terminal of the electromagnets of the magnet valves 34, 35 and 36 are respectively connected by branch wires 77, 78 and 79, the train wires 74, 75 and 76 being connected respectively to one contact member 62, one contact member 63 and one contact member 64, respectively. The remaining contact members 62, 63 and 64 are connected to a common wire 81 which is adapted to be connected by the pressure operated switch 19 to a wire 82 which is connected to one terminal of the battery 17, such as the positive terminal. The remaining terminals of the electromagnets of the magnet valves 34, 35 and 36 may be connected to the negative terminal of the battery 17 as through a ground connection in the manner shown.

The pressure operated switch 19 is illustrative of any suitable device for connecting the wire 81 to the wire 82 when the pressure in the control pipe 14 increases above a certain uniform low pressure, such as five pounds per square inch. The pressure operated switch device 19 may comprise a casing containing a piston 84 having a stem 85 carrying in insulated relation thereon a contact-bridging member 86 for engaging an associated pair of contact fingers 87 in circuit-closing contact, one of the contact members 87 having the wire 81 connected thereto and the other contact member 87 having the wire 82 connected thereto. At one side of the piston 84 is a chamber 88 which is constantly connected to and charged with fluid under pressure from the control pipe 14 through a branch pipe 89 leading from the control pipe 14 to the valve mechanism 15 and a branch pipe 91 of the pipe 89. At the opposite side of the piston is a spring 92 which is so designed and tensioned as to yieldingly urge the piston 84 downwardly into engagement with a plurality of stop lugs 93 on the casing of the pressure switch 19 as long as the pressure in the chamber 88 does not exceed a certain uniform low pressure, such as five pounds per square inch. In this position of the piston 84 the contact-bridging member 86 is lowered out of engagement with the associated contact members 87. When the pressure of fluid supplied to the chamber 88 exceeds the certain uniform low pressure of five pounds per square inch, the spring 92 is overcome and the stem 85 and contact-bridging member 86 shifted upwardly into circuit-closing engagement with the contact members 87.

The sanding device 21, indicated in block form, is representative of any suitable sanding apparatus which is operative upon the supply of fluid under pressure thereto to deposit sand upon the track rails adjacent the car wheels. Such devices are well known and it is deemed unnecessary to offer further description thereof herein.

The magnet valve device 23 comprises a pair of oppositely seating valves 95 and 96, hereinafter designated the supply valve and release valve respectively, and an electromagnet 97 for operatively shifting the valves 95 and 96 through the medium of a plunger or stem 98.

The supply valve 95 is contained in a chamber 101 which is constantly connected to the supply pipe 13 through a branch pipe 102, and the release valve 96 is contained in a chamber 104 which is constantly open to atmosphere through exhaust port 105. The valves 95 and 96 are provided with fluted stems which meet in end-to-end contact within a chamber 107, located between the chambers 101 and 104 and constantly connected through a pipe 108 to the sanding device 21.

A coil spring 109 is provided in chamber 101 for yieldingly urging the supply valve 95 and the release valve 96 to seated and unseated positions, respectively, when the electromagnet 97 is deenergized. When the electromagnet 97 is energized, it causes the valves 95 and 96 to be shifted to unseated and seated positions, respectively, against the resisting yielding force of the spring 109.

The release valve 96 is effective, when unseated to establish communication from the sanding device 21 to atmosphere by way of the pipe 108, chambers 107 and 104 and exhaust port 105; and is effective, when seated, to close this exhaust communication. The supply valve 95 is effective, when unseated, to establish communication from the supply pipe 13 to the sanding device 21 by way of the branch pipe 102, chambers 101 and 107, and pipe 108 to cause fluid under pressure to be supplied from the pipe 13 to the sanding device 21 to effect sanding of the track rails. When the supply valve 95 is seated this supply communication is closed.

Energization and deenergization of the electromagnet 97 of the magnet valve device 23 is effected under the control of the relay 25, the pressure switch 26 and the manually operable switch 27.

The relay 25 may be any conventional relay device comprising an electromagnet winding, an associated magnet core, and an armature actuated upon energization of the electromagnet winding to operate circuit-controlling contact members. As diagrammatically shown, the relay 25 comprise an electromagnet winding 111 effective upon energization to cause shifting of a contact member 112 from a circuit-closing to a circuit-opening position.

The pressure switch 26 is similar to the pressure switch 19 and as diagrammatically illustrated may comprise a casing containing a piston 114 having a stem 115 which carries in insulated relation thereon a contact-bridging member 116 which is adapted to engage a pair of fixed contact members 117. At one side of the piston 114 is a coil spring 118 which yieldingly urges the piston 114 to a position in which the contact-bridging member 116 disengages the contact members 117. At the opposite side of the piston 114 to the spring 118 is a chamber 119 which is connected by a branch pipe 121 to the brake cylinder pipe 16. The spring 118 is so designed and tensioned that it maintains the contact-bridging member 116 out of contact with the associated contact members 117 as long as the pressure of the fluid supplied to the brake cylinder and effective in the chamber 119 on the piston 114 does not exceed a certain uniform pressure, such as thirty pounds per square inch, which pressure is selected as being sufficiently low that sliding of the vehicle wheels will not occur under average rail conditions. When the pressure in the brake cylinder exceeds this certain uniform pressure, the spring 118 yields and permits contact-bridging member 116 to be lifted into contact with contact members 117.

The manually operated switch 27 comprises a suitable casing 125, a portion of which is shown, in which is slidably mounted an operating plunger or stem 126. The stem 126 has a button 127 at the upper exterior end thereof adapted to be grasped by the operator and carried in insulated relation thereon, two contact members 128 and 129.

The stem 126 is centered in a normal axial position by two coil springs 131 and 132 which are arranged to resist upward movement of the stem 126 and downward movement of the stem 126, respectively out of its normal position.

In the normal position of the stem 126, the contact member 128 connects or bridges a pair of insulated contact members 133 suitably mounted in the casing. When the stem 126 is shifted upwardly by the operator grasping button 127 and pulling upwardly, the contact-bridging member 128 disengages the contact members 133. When the stem 126 is moved downwardly from its normal position by the operator pressing on the button 127, the contact-bridging member 129 connects a pair of insulated contact members 134 suitably mounted in the casing.

The contact-bridging member 128 is of sufficient length axially of the stem 126 that it remains in bridging contact with its associated contact members 133 when the stem 126 is moved downwardly to effect engagement of the contact-bridging member 129 with its associated contact members 134.

One terminal of the electromagnet winding 111 of the relay 25 is connected by a branch wire 136 to the train wire 76 and the other terminal is connected to the negative terminal of the battery 17 as through a ground connection in the manner shown. It will thus be apparent that whenever the train wire 76 is connected to the positive terminal of the battery 17 through the contact-birdging member 49 of governor switch 18 and contact member 86 of the pressure switch 19, the electromagnet winding 111 will be energized and the contact member 112 of relay 25 will be shifted to circuit-opening position.

One of the contact members 117 of the pressure switch 26 is connected by a branch wire 137 to the train wire 82 which is directly connected to the positive terminal of the storage battery 17. The other contact member 117 of the pressure switch 26 is connected to the one of the contact members 133 of the manually operated switch 27 by a wire 138, the circuit through which is controlled by the relay 25. To the other contact member 133 of the manual switch 27 is connected a train wire 139, hereinafter designated the sanding wire. One terminal of the electromagnet winding 97 of the magnet valve device 23 is connected by a branch wire 141 to the sanding wire 139 as are also corresponding terminals of other magnet valve devices, not shown, on other cars of the train. The opposite terminal of the electromagnet winding 97 of the magnet valve device 23 is connected to the negative terminal of the battery 17 as through a ground connection in the manner shown.

It will thus be apparent that when the contact-bridging member 116 of the pressure switch 26 is shifted to circuit-closing position, with the contact member 112 of the relay 25 in circuit-closing position and the stem 126 of the manual switch 27 in its normal position, a circuit is established for energizing the electromagnet winding 97 of the magnet valve device 23.

One of the contact members 134 of the manual switch 27 is connected by a branch wire 142 and the branch wire 137 to the battery wire 82, while the other contact member 134 is connected by a branch wire 144 to the sanding wire 139.

It will thus be apparent that whenever the stem 126 of the switch 27 is shifted downwardly to cause the contact-bridging member 129 to engage contact members 134, a circuit is established for energizing the electromagnet valve device 97 of the magnet valve device 23, independently of the other circuit through the pressure switch 26, relay 25 and contact member 128 of the switch 27.

Operation of equipment

Assuming that the main reservoir 12 is charged to the normal pressure carried therein, such as one hundred and twenty-five pounds per square inch, from a fluid compressor not shown, and that the car or train of cars is traveling at a high speed, such as one hundred miles per hour, the operator may initiate an application of the brakes by charging the control pipe 14 to a desired pressure by means of a suitable brake valve not shown.

Upon the charging of the control pipe 14 to a pressure in excess of a certain uniform low pressure, such as five pounds per square inch, the pressure switch 19 is operated to circuit-closing position to connect the positive terminal of the battery 17 to the contact members 62, 63 and 64 of the governor switch 18. At the same time, since the car or train is traveling at a speed in excess of sixty-five miles per hour, the governor switch contact-bridging members 47 and 48 are in circuit-closing position and thus energization of the train wires 74 and 75 is effected upon closing of the pressure switch 19.

Accordingly, the valve mechanism 15 is conditioned by the energization of the high magnet valve 34 and the medium magnet valve 35 and the deenergization of the low magnet valve 36 to establish a pressure in the brake cylinder 11 which is substantially equal to the pressure established in the control pipe 14.

When the pressure in the brake cylinder 11 exceeds a pressure, such as thirty pounds per square inch, the pressure switch 26 is operated to circuit-closing position and the circuit, previously described, is established for energizing the electromagnet winding 97 of the magnet valve device 23 by way of the pressure switch 26, relay 25 and contact-bridging member 128 of the manual switch 27. The magnet valve device 23 is thus operated to cause fluid under pressure to be supplied from the supply pipe 13 to the sanding device 21 to thereby effect sanding of the track rails automatically.

Since the pressure in the brake cylinder 11 builds up rapidly to a pressure in excess of thirty pounds per square inch under the conditions assumed, the sanding of the rails occurs substantially upon the initiation of the application of the brakes.

When the car or train reduces to a speed below sixty-five miles per hour and the contact-bridging member 47 of the governor switch 18 accordingly shifts to circuit-opening position, the train wire 74 is deenergized and consequently the high magnet valve 34 of the valve mechanism 15 is deenergized. Thus, during the time that the car or train reduces in speed from sixty-five miles per hour to the intermediate speed of forty miles per hour, only the medium magnet valve 35 of the valve mechanism 15 is energized and, accordingly, the valve mechanism 15 is operated to reduce the pressure in the brake cylinder to the assumed fraction, such as three-fourths, of the pressure established in the control pipe 14.

Assuming that the pressure in the brake cylinder 11 is not reduced, at this time, below thirty pounds per square inch, the circuit for energizing the electromagnet winding 97 of the magnet valve device 23 remains closed and thus sanding of the track rails continues.

When the car or train reduces below the intermediate speed of forty miles per hour, the contact member 48 of the governor switch 18 is shifted to circuit-opening position, thereby deenergizing the train wire 75 and the medium magnet valve 35 of the valve mechanism 15. Accordingly, since all of the contact members 47, 48 and 49 of the governor switch 18 are now in circuit-opening position, all of the train wires 74, 75 and 76 are deenergized and consequently all of the magnet valves 34, 35 and 36 of the valve mechanism 15 are deenergized.

The valve mechanism 15 is operated, when the car or train reduces below the intermediate speed of forty miles per hour, to effect a reduction of brake cylinder pressure to a still lower fraction, such as one-half, of the pressure established in the control pipe 14. Assuming that the brake cylinder pressure is still in excess of thirty pounds per square inch and that the pressure switch 26 accordingly remains in circuit-closing position, the magnet valve device 23 continues to be energized to effect sanding of the track rails.

When the car or train reduces in speed below the low speed of twenty miles per hour, the contact member 49 of the governor switch 18 is shifted to circuit-closing position and energization of the train wire 76 and the low magnet valve 36 connected thereto effected. Accordingly, with the high and medium magnet valves 34 and 35 deenergized, and the low magnet valve 36 energized, the valve mechanism 15 is operated to effect reduction of brake cylinder pressure to a still lower fraction, such as one-third, of the pressure established in the control pipe 14.

Since, as previously explained, the relay 25 is energized upon energization of the train wire 76, contact member 112 of relay 25 is now shifted to circuit-opening position to effect deenergization of electromagnet winding 97 of the magnet valve device 23. Magnet valve device 23 is thus operated to cut off the supply of fluid under pressure to the sanding device 21 and thereby effect termination of sanding of the track rails. Sanding of the track rails may continue for a short interval of time after the operation of the magnet valve 23 to cut off the supply of fluid under pressure to the sanding device 21, due to the reducing pressure of the fluid remaining in the pipe 108 leading to and the chamber within the sanding device.

When the car or train comes to a complete stop, the pressure which is the lowest fraction, such as one-third, of the pressure established in the control pipe, remains in the brake cylinder 11 to hold the car or train against creepage.

Obviously, the operator may vary the pressure in the control pipe 14 at any time during the application but the ratio of the pressure in the brake cylinder to that established in the control pipe does not vary for any given speed range. Thus, when the car or train comes to a complete stop on a grade, the operator may increase the pressure in the control pipe 14 to increase the brake cylinder pressure sufficiently to hold the car or train against creepage.

Should the pressure in the brake cylinder 11 reduce below the predetermined pressure of thirty pounds per square inch required to maintain the pressure switch 26 in circuit-closing position, as the result of reduction of brake cylinder pressure effected by the valve mechanism 15, the pressure switch 26 will be operated to circuit-opening position to effect deenergization of the electromagnet winding 97 of the magnet valve device 23 before the car or train actually reduces in speed sufficiently to effect energization of the train wire 76 and low magnet valve 36. As previously stated, the uniform brake cylinder pressure below which switch 26 remains in circuit-opening position is such that sliding of the car wheels will not occur except under most unusual rail and weather conditions, so that the operation of the pressure switch 26 to terminate sanding of the rails conserves the supply of sand and prevents unnecessary waste of sand.

If a test application of the brakes is made when the car or train is at a standstill, the automatic sanding of the rails is prevented because the relay 25 is energized and accordingly prevents automatic sanding notwithstanding the operation of the pressure switch 26 to circuit-closing position in response to the fluid pressure established in the brake cylinder. Unnecessary waste of sand is accordingly prevented. As will appear presently, sanding of the rails may be effected under manual control when desired, even though the speed of the car or train is below the speed at which relay 25 is energized, so that the automatic cut-off of sanding at low speed does not interfere with sanding when necessary.

If rail and weather conditions are so favorable that, in the judgment of the driver or operator of the car or train, sanding is unnecessary upon application of the brakes, the operator may suppress the automatic sanding of the rails at the time the application of the brakes is initiated by grasping the button 127 on the end of the stem 126 of the switch 27 and pulling it upwardly, as viewed in the figure. The contact-bridging member 128 is thus shifted to a position disconnecting the contact members 133 and interrupting the circuit for the electromagnet winding 97 of the magnet valve device 23 so that operation of the pressure switch 26 to circuit-closing position upon application of the brakes does not cause operation of the magnet valve device 23 to cause sanding of the track rails.

If rail and whether conditions are so unfavorable that, in the judgment of the operator or driver of the car or train, it is necessary to sand the rails on starting from a stopped position or to continue sanding of the rails even after the speed of the car or train reduces below the low speed setting of the governor switch, namely twenty miles per hour, as the car or train approaches a complete stop, the operator may depress the stem 126 of the switch 27 to cause shifting of the contact-bridging member 129 to circuit-closing position to energize the electro-magnet winding 97 of the magnet valve device 23 independently of the pressure switch 26, of relay 25, or of contact-member 128 of the switch 27. Thus the switch 27 is operative at any desired time to cause operation of the magnet valve 23 to supply fluid under pressure to the sanding device 21 to cause sanding of the rails.

In order to effect release of the brakes before starting the car or train from a stopped position, the operator reduces the pressure in the control pipe 14 to atmospheric pressure. The pressure switch 19 is thus operated to circuit-opening position to disconnect the battery 17 from the governor switch 18 and thereby effect deenergization of the train wires 74, 75 and 76 and the corresponding deenergization of the magnet valves 34, 35, and 36 of the valve mechanism 15. Since the pressure in the control pipe 14 is reduced to atmospheric pressure, however, the pressure in the diaphragm chambers of the diaphragm portion 32 of the valve mechanism 15 is likewise reduced to atmospheric pressure and, consequently, the self-lapping valve mechanism of the valve mechanism 15 is operated automatically to exhaust fluid under pressure from the brake cylinder 11 to atmosphere and thus effect the complete release of the brakes.

*Summary*

Summarizing, it will be seen that I have disclosed apparatus for effecting sanding of the track rails automatically upon the initiation of the application of the brakes to a degree in excess of a certain uniform degree, the sanding being terminated automatically when the speed of the car or train reduces below a predetermined uniform low speed or in the event of reduction in the degree of the brake application below a predetermined low degree, whichever occurs first. It will be seen also that the apparatus disclosed enables the suppression of the automatic sanding operation at any time under the control of the operator of the car or train as well as sanding of the rails at any time under the manual control of the operator independently of the automatic control of sanding operation.

I have shown only one sanding device but it will be apparent that, in the application of my invention to a train of cars, any number of sanding devices may be provided and the controlling magnet valves therefor all connected to the single sanding wire 139 so that all the magnet valves are simultaneously controlled by the pressure switch 26, the relay 25 and the manually operable switch 27 in exactly the same manner as described for the single controlling magnet valve 23.

Thus while I have illustrated only one embodiment of my invention, it will be apparent that various omissions, additions and modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. The combination with a vehicle brake equipment, of rail-sanding means, means operative automatically upon an application of the brakes in excess of a certain uniform degree for causing said sanding means to effect sanding, and separate means controlled by the speed of the vehicle for rendering said automatically operative means non-effective to cause the sanding means to effect sanding unless the vehicle exceeds a certain uniform speed.

2. The combination with a vehicle brake equipment, of rail-sanding means for the vehicle, control means effective in response to an application of the vehicle brakes for causing said sanding means to effect sanding, means controlled by the speed of the vehicle and operatively independent of said control means for preventing said control means from causing the sanding means to effect sanding unless the vehicle exceeds a certain speed, and means under the control of the operator and operative at any time to prevent the said control means from causing the sanding means to effect sanding notwithstanding operation of the control means tending to cause sanding.

3. In a vehicle brake and sanding apparatus, the combination of brake means, means for controlling the force of application and the release of said brake means, sanding means, means responsive to the speed of the vehicle, and means controlled according to the force of application of the brake means, the said last two means being jointly effective to control the operation of the sanding means.

4. In a vehicle brake and sanding apparatus, the combination of fluid pressure operated brake means, means for controlling the supply of fluid under pressure to and the release of fluid under pressure from said brake means for effecting application and release of the brakes, sanding means, means responsive to the speed of the vehicle, fluid pressure operated means subject to a pressure corresponding to the pressure operating the fluid pressure brake means, the said speed-responsive means and the said fluid pressure operated means being jointly effective to control the operation of the sanding means.

5. In a vehicle brake and sanding apparatus, the combination of fluid pressure operated brake means, means for effecting the supply of fluid under pressure to and the release of fluid under pressure from said brake means to cause application and release of the brakes, sanding means, means responsive to the speed of the vehicle, fluid pressure responsive means subject to a pressure corresponding to the operating fluid pressure for the brake means and actuated from a normal position to an operative position only when the operating pressure therefor exceeds a certain uniform pressure, said speed-responsive means being effective when the speed of the vehicle exceeds a certain speed and the fluid pressure responsive means is in its operative position for causing operation of the sanding means to effect sanding.

6. In a vehicle brake and sanding apparatus, the combination of a brake cylinder, means for controlling the supply of fluid under pressure to and the release of fluid under pressure from the brake cylinder to effect application and release of the brakes, means responsive to the speed of the vehicle, sanding means, fluid pressure responsive means subject to the pressure in the brake cylinder and actuated from a normal position to an operative position when the pressure in the brake cylinder exceeds a certain uniform pressure, said speed-responsive means being effective when the fluid pressure responsive means is in its operative position to cause operation of the sanding means to effect sanding as long as the speed of the vehicle exceeds a certain uniform speed and being operative to cause said sanding means to cease sanding when the speed of the vehicle reduces below said certain uniform speed.

7. In a vehicle brake and sanding apparatus, brake means, sanding means, means for controlling application and release of said brake means, means other than the brake means responsive to the speed of the vehicle, and fluid pressure responsive means controlled according to the degree of application of the brake means, said speed responsive means and fluid pressure responsive means being jointly effective to control the operation of said sanding means.

8. In a vehicle brake and sanding apparatus, the combination of brake means, manually controlled means for effecting application of the brake means to a desired degree and also the release of the brakes, means controlled according to the speed of the vehicle and effective when the vehicle reduces below a certain uniform speed for effecting a reduction in the degree of application of the brake means independently of the manually operative control means, sanding means, and means controlled by the speed-responsive means for causing operation of the sanding means to effect sanding upon an application of the brakes and to cause the sanding means to cease sanding at the time the speed-responsive means is effective to cause a reduction in the degree of application of the brakes.

9. In a vehicle brake and sanding apparatus, the combination of a brake cylinder, means for controlling the supply of fluid under pressure to and the release of fluid under pressure from the brake cylinder to control the degree of application of the brakes and the release of the brakes, means responsive to the speed of the vehicle for effecting operation of the control means to cause a plurality of consecutive reductions in the degree of application of the brakes as the speed of the vehicle consecutively reduces below predetermined uniform speeds, sanding means, fluid pressure responsive means subject to the pressure in the brake cylinder, said speed-responsive means and fluid pressure responsive means being jointly effective to control the operation of the sanding means.

10. In a vehicle brake and sanding apparatus, the combination of a brake cylinder, means for controlling the supply of fluid under pressure to and the release of fluid under pressure from the said brake cylinders to control the degree of application and the release of the brakes, means responsive to the speed of the vehicle for so controlling said brake control means as to effect periodically a plurality of consecutive reductions in the degree of application of the brakes as the speed of the vehicle consecutively reduces below a corresponding plurality of predetermined uniform speeds, sanding means, fluid pressure responsive means subject to the pressure in the brake cylinder and actuated from a normal position to an operative position when the pressure in the brake cylinder exceeds a certain uniform pressure, said speed-responsive means and said fluid pressure responsive means being jointly effective to cause operation of the sanding means to effect sanding upon and during an application of the brakes as long as the vehicle exceeds a certain speed and said fluid pressure responsive means is in its operative position, said speed-responsive means being effective to cause the sanding means to cease sanding at the same time it causes operation of the brake control means to effect the last in the series of consecutive reductions in the degree of application of the brakes.

11. In a vehicle brake and sanding apparatus, the combination of a brake cylinder, means for controlling the supply of fluid under pressure to and the release of fluid under pressure from the brake cylinder to control the degree of application and the release of the brakes, means responsive to the speed of the vehicle for so controlling said brake control means as to cause it to effect a reduction from the initially established degree of application of the brakes when the vehicle reduces in speed below a certain uniform speed, further reducing the degree of application of the brakes when the vehicle reduces in speed below a second certain uniform speed lower than the first uniform speed, and also further reducing the degree of application of the brakes when the vehicle reduces in speed below a third certain uniform speed lower than the second uniform speed, sanding means, fluid pressure responsive means subject to the pressure in the brake cylinder and actuated from a normal position to an operative position when the pressure in the brake cylinder exceeds a certain uniform pressure, said speed-responsive means and fluid pressure responsive means being jointly effective when the pressure in the brake cylinder exceeds said certain uniform pressure and the speed of the vehicle exceeds the third uniform speed for causing operation of the sanding means to effect sanding, said speed-responsive means being effective to cause the sanding means to cease sanding whenever the speed of the vehicle reduces below said third uniform speed.

12. In a vehicle brake and sanding apparatus, the combination of a brake cylinder, means for effecting the supply of fluid under pressure to and the release of fluid under pressure from the brake cylinder to cause application of the brakes to different degrees and the release of the brakes, sanding means, means responsive to the speed of the vehicle, fluid pressure responsive means subject to the pressure in the brake cylinder, said speed-responsive means and fluid pressure responsive means being jointly effective to cause operation of said sanding means to effect sanding as long as the speed of the vehicle exceeds a certain uniform speed and the pressure in the brake cylinder exceeds a certain uniform pressure, and means under the control of the operator for effecting operation of said sanding means to cause sanding at any time.

13. In a vehicle brake and sanding apparatus, the combination of a brake cylinder, means for effecting the supply of fluid under pressure to and the release of fluid under pressure from the brake cylinder to control the degree of application and the release of the brakes, sanding means, means responsive to the speed of the vehicle, fluid pressure responsive means subject to a pressure corresponding to the pressure in the brake cylinder and actuated from a normal position to an operative position whenever the pressure acting thereon exceeds a certain uniform pressure, said speed-responsive means and fluid pressure responsive means being jointly effective to cause automatic operation of the said sanding means to effect sanding upon application of the brakes as long as the speed of the vehicle exceeds a certain uniform speed and the fluid pressure responsive means is in its operative position, said speed-responsive means being effective when the speed of the vehicle is less than said certain uniform speed for preventing operation of the sanding means to cause sanding upon application of the brakes, and means under the control of the operator for preventing operation of the sanding means to effect sanding notwithstanding that the vehicle is traveling at a speed in excess of said certain uniform speed and the fluid pressure responsive means is in its operative position.

14. In a vehicle brake and sanding apparatus, the combination of a brake cylinder, means for effecting the supply of fluid under pressure to and the release of fluid under pressure from the brake cylinder to cause application of the brakes to different degrees and the release of the brakes, sanding means, means controlled according to the speed of the vehicle, fluid pressure responsive means controlled according to the pressure in the brake cylinder, said speed-responsive means and fluid pressure responsive means being jointly effective to control the operation of said sanding means, and means under the control of the operator for effecting operation of the sanding means to cause sanding independently of said speed-responsive and fluid pressure responsive means.

15. In a vehicle brake and sanding apparatus, the combination of a brake cylinder, means for effecting the supply of fluid under pressure to and the release of fluid under pressure from the brake cylinder to cause application of the brakes to different degrees and the release of the brakes, sanding means, means controlled according to the speed of the vehicle, fluid pressure responsive means controlled according to the pressure in the brake cylinder, said speed-responsive means and fluid pressure responsive means being jointly effective to control the operation of said sanding means, and means under the control of the operator for rendering the speed-responsive means and the fluid pressure responsive means ineffective to control the operation of the sanding means.

16. In a vehicle brake and sanding apparatus, the combination of a brake cylinder, means for effecting the supply of fluid under pressure to and the release of fluid under pressure from the brake cylinder to cause application of the brakes to different degrees and the release of the brakes, sanding means, means controlled according to the speed of the vehicle, fluid pressure responsive means controlled according to the pressure in the brake cylinder, said speed-responsive means and fluid pressure responsive means being jointly effective to control the operation of said sanding means, and means under the control of the operator operative at one time to render the speed-responsive means and the fluid pressure responsive means ineffective to control the sanding means and at another time to effect operation of the sanding means to cause sanding independently of the speed-responsive means and the fluid pressure responsive means.

17. In a vehicle brake and sanding apparatus, a brake cylinder, means for controlling the fluid pressure in said brake cylinder for controlling the degree of application and the release of the brakes, switch means operatively responsive to the speed of the vehicle, another switch means operatively responsive to the pressure in the brake cylinder, a circuit including said two switch means in series relation therein, and electroresponsive means operating on said circuit for controlling sanding.

18. In a vehicle brake and sanding apparatus, a brake cylinder, means for controlling the fluid pressure in said brake cylinder for controlling the degree of application and the release of the brakes, switch means controlled in response to vehicle speed and actuated to closed position only when the speed of the vehicle exceeds a certain uniform speed, another switch means controlled by the pressure in the brake cylinder and operated to closed position only when the pressure in the brake cylinder exceeds a certain uniform pressure, a circuit including said two switch means in series relation therein and adapted to be completed when both the switch means are closed, and electroresponsive means operating on said circuit and effective when said circuit is completed for causing sanding.

19. In a vehicle brake and sanding apparatus, a brake cylinder, means for controlling the fluid pressure in said brake cylinder for controlling the degree of application and the release of the brakes, switch means controlled in response to vehicle speed and actuated to closed position only when the speed of the vehicle exceeds a certain uniform speed, another switch means controlled by the pressure in the brake cylinder and operated to closed position only when the pressure in the brake cylinder exceeds a certain uniform pressure, a circuit including said two switch means in series relation therein and adapted to be completed when both the switch means are closed, electroresponsive means operating on said circuit and effective when said circuit is completed for causing sanding, and manually operative switch means for interrupting said circuit to prevent said electroresponsive means from being effective to cause sanding under the control of said two switch means.

ELLERY R. FITCH.